Patented Apr. 14, 1953

2,635,061

UNITED STATES PATENT OFFICE 2,635,061

ION-EXCHANGE PURIFICATION OF SUGAR

Charles H. McBurney, Philadelphia, Pa., assignor to Rohm & Haas Company, Philadelphia, Pa., a corporation of Delaware No Drawing. Application April 13, 1948, Serial No. 20,836

9 Claims. (Cl. 127—46)

This invention relates to a new class of resinous materials having anion-exchange properties and more particularly to a method of using those resinous materials in combination with cation-exchange materials to produce results not heretofore obtainable.

This application is a continuation-in-part of my copending application Serial No. 759,308, filed July 5, 1947, now U. S. Patent Number 2,591,573, issued April 1, 1952.

It is known that salts, both organic and inorganic, present in an aqueous solution may be removed by passing the solution first through a bed of insoluble cation-exchange material in its hydrogen form and then through a bed of insoluble anion-exchange material in its basic form. If the salt present is sodium chloride, the bed of cation-exchange material removes the sodium by a reaction that may be represented by the equation (1) $\quad \text{NaCl} + \text{H(CX)} \rightleftharpoons \text{HCl} + \text{Na(CX)}$ where (CX) represents the residue of the insoluble cation-exchange material. The bed of anion-exchange material removes the chlorine from the solution by a reaction that may be represented by the equation (2) $\quad \text{HCl} + \text{HO(AX)} \rightarrow \text{H}_2\text{O} + \text{Cl(AX)}$ wherein (AX) represents the residue of the insoluble anion-exchange resin. Heretofore it has not been practical to reverse this order of ion removal for the reason that the basic anion-exchange materials that have been available have not possessed the ability to split neutral salts. With these known basic anion-exchange materials the direction of the reaction, which may be represented by the equation (3) $\quad \text{NaCl} + \text{HO(AX)} \leftarrow \text{NaOH} + \text{Cl(AX)}$ is so strongly to the left that passing a salt solution through a bed of the resin does not effect a removal of chloride ion.

It is sometimes desirable to remove salts from solutions without the formation of an acid condition in the solution. An example of this is in sugar refining wherein the presence of acid in the sugar-bearing syrups causes an inversion of the sucrose and its consequent loss. Because of this it has heretofore been the practice when ion-exchange materials are used to remove ionizable materials from sugar syrups to cool the syrup to about 20° C. whereby inversion is retarded. Such cooling of the syrups is practical only in localities where low temperature cooling water is readily available in large amounts and is undesirable because of the heat loss involved and the viscous condition of the syrups at low temperatures. A more practical way to overcome the difficulty is to avoid the formation of acid during the deionizing process and I have found that this may be done by means of a new class of synthetic anion-exchange resins which contain quaternary ammonium groups as their polar groups. Unlike the heretofore known anion-exchange materials these quaternary ammonium anion-exchange resins will split salts and remove anions from salt solutions. With these new resins Equation 3 above becomes, like Equation 1, a reversible reaction. When a solution containing salt impurities is passed through a bed of these new resins, the anions are removed by the resin leaving free base in solution. This free base may then be removed by cation-exchange material through a reaction that may be represented by the equation (4) $\quad \text{NaOH} + \text{H(CX)} \rightarrow \text{Na(CX)} + \text{H}_2\text{O}$ In my above-mentioned application Serial No. 759,308 I have described one method for producing a quaternary ammonium anion-exchange resin. That method comprises haloalkylating a copolymer of a monovinyl aromatic compound, such as styrene, and a divinyl aromatic compound, such as divinyl benzene, and converting the haloalkylated copolymer to a quaternary ammonium alkylated copolymer by treating with a tertiary amine. In an analogous manner, other base resins having aromatic groups may be haloalkylated and converted to quaternary ammonium alkylated resins. Such base resins include, for example, polystyrene itself, phenol aldehyde resins particularly those of the Novolak type, and hydrocarbon resins such as are formed by the Friedel-Crafts reaction of alkyl dihalides with aromatic hydrocarbons or of chloroalkyl aromatic compounds with themselves or in admixture with aromatic hydrocarbons. When such resins have a crossed-linked structure to the extent that they are not soluble in the haloalkylating agent, they may be admixed with the haloalkylating agent in the form of granules, preferably ranging in size from 5 to about 325 mesh, and the Friedel-Crafts condensing agent, such as aluminum chloride or zinc chloride added to promote the haloalkylating reaction. When the resin is soluble in the haloalkylating agent, it is preferable to add the granules to a mixture of the Friedel-Crafts condensing agent and the haloalkylating agent whereby there can be accomplished a simultaneous haloalkylation of the resin and a degree of cross-linking in the molecular structure of the resin to render it insoluble. The haloalkylating agent preferably used is a chloromethyl ether of the formula $CH_3OCH_2Cl$ or $ClCH_2OCH_2Cl$ because it is convenient to use and easily prepared from inexpensive chemicals. Others, such as formaldehyde or other aldehyde and hydrochloric acid, may be used. The conversion of the haloalkylated resins to quaternary ammonium resins is conveniently carried out by stirring the granules of the chloroalkylated resin in a solvent for the tertiary amine, adding the amine, and continuing the stirring while heating mildly until reaction is complete. Better penetration of the granules by the tertiary amine will result from the selection of a solvent that has some swelling action upon the resin without dissolving it. The amine selected may be aliphatic, aromatic, cycloalkyl, arylalkyl, or heterocyclic. Typical of those that may be used are trimethylamine, triethylamine, tripropylamine, dimethylethylamine, allyldimethylamine, diethylcyclohexylamine, tricyclohexylamine, dimethyl aniline, diphenylethylamine, benzyldimethylamine, benzylphenylmethylamine, pyridine, and the like.

The quaternary ammonium resin as thus prepared is in the form of its halogen acid salt. It may be converted to the free base form by passing through it a solution of sodium hydroxide or other strong base. The reaction that takes place is that represented by Equation 3 above going from right to left. When the free base resin is utilized to remove anions from salt solutions, the direction of the reaction is reversed. Being a reversible reaction, equilibrium conditions will exist between the resin and the solution with which it is in contact and as a result salt will begin to leak through the bed prior to the exhaustion of its exchange capacity. It is, therefore, frequently desirable to utilize two or more beds in series and to carry the first bed considerably beyond the point of salt breakthrough before it is removed from the line and regenerated. When this is done, the partially exhausted second bed is then placed first in the line and a bed of fresh resin added at the end.

If the solution being deionized contains a substantial concentration of salts, it will be desirable to use a series of alternating anion- and cation-exchangers, thereby effecting a stepwise removal of the salts. When this practice is followed, the cation-exchange resins heretofore used in deionization processes may not be used if acidic conditions are to be avoided for such resins will not only remove the free base in the effluent from the anion-exchanger but will also react with the salt that is allowed to pass through, whereby free acid will be formed. This free acid can be avoided by utilizing as the cation-exchanger a material which has carboxylic acid groups as the functioning polar groups. These carboxylic exchangers in their acidic form will remove free base from solutions but are ineffective in removing cations from salt solutions. With these resins the direction of Reaction 1 above is so strongly to the left that the pH of the solution passing through the resin under normal operating conditions never goes lower than about 3.5, whereas with the sulfate or sulfonate type of cation-exchanger heretofore used the pH would drop to as low as 1.5.

In instances where a pH of 3.5 is lower than desired, the carboxylic type exchanger may be utilized in a mixed sodium and hydrogen form whereby the effluent may be maintained at any desired pH between 3.5 and 7. A mixed sodium and hydrogen form of carboxylic exchange resin may be formed by regenerating the resin with a mixture of sodium salt and acid. By varying the ratio of the salt and acid in the regenerant solution the ratio of replaceable sodium and hydrogen ions in the regenerated resin may be varied at will. The higher the ratio of sodium to replaceable hydrogen in the resin, the higher will be the lowest pH reached.

Carboxylic type cation-exchange resins that are particularly suitable for use in this fashion with the quaternary ammonium anion-exchange resins are the cross-linked polymers of polymerizable acids, particularly the cross-linked polymers of acrylic acid, methacrylic acid, and maleic acid. They can be made by the joint polymerization of a polymerizable acid and a divinyl aromatic compound as described in U. S. Patents Nos. 2,340,110 and 2,340,111. These resins contain a large number of carboxylic groups and have a high exchange capacity. Other types such as are formed by the condensation of hydroxy benzoic acids with formaldehyde may be used if desired. My preference is a resin formed by the suspension copolymerization of from 90 to 97½ parts of acrylic or methacrylic acid with from 2½ to 10 parts of divinyl benzene.

In applying this invention to the deionization of sugar-bearing syrup, either from cane or sugar beet, the preferred practice is to use a series of alternating anion- and cation-exchange beds and to use a carboxylic cation-exchanger. The syrup after the usual clarification or defecation steps may, if desired, be cooled somewhat although this is not normally necessary, particularly where the minimum pH is kept fairly high. It is then passed through a first bed of quaternary ammonium anion-exchanger. The pH of the initial effluent from this bed of resin will be as high as 12. As the bed becomes exhausted, the pH of the effluent will begin to drop and it may then be taken off the line for regeneration or may be continued in the line until the pH of the effluent reaches any desired point above that of the syrup being treated. The effluent from the anion-exchanger is then passed through a bed of carboxylic acid type cation-exchanger wherein the free base in the solution is removed. The initial effluent from the cation-exchanger, if the exchanger is used in the fully acid form, will be approximately 3.5 and will be higher in the case of a mixed alkali metal-hydrogen form of exchanger. As the cation bed becomes exhausted, the pH will begin to rise and again the bed may be taken out of the line at this point or continued in service until any desired pH is reached. The beds of anion- and cation-exchange resins may be balanced so that both become exhausted at about the same time and may be taken off the line together. Passage of sugar syrup through one pair of beds will remove sufficient ionizable material to decrease the conductivity of the solution to as little as one-fifteenth of its original conductivity, but the extent of reduction in a single bed will depend largely upon how much salt is allowed to pass through prior to taking the beds off the line.

From the first pair of beds the syrups are passed through a second similar pair of beds and, if desired, through a third wherein further reductions in salt concentration are effected. Many of the colored bodies in the syrups will also be removed, particularly from sugar beet syrups, and in the case of cane sugar further improvement in color is accomplished if at some stage of the process a salt-splitting cation-exchange resin, such as a sulfonated phenol-formaldehyde or sulfonated copolymer of styrene and divinyl benzene, is used. When a resin of this type is used to obtain improved color, it is preferable that this be done after the syrups are substantially deionized.

The following examples are given to illustrate the preparation of the new quaternary ammonium ion-exchange resins.

*Example 1*

A. Into a one-liter, three-necked, balloon flask equipped with thermometer, mechanical stirrer, and reflux condenser was poured 400 ml. of water and 34 ml. of a 1.5% aqueous solution of magnesium silicate. Agitation was begun and a solution containing 97.5 g. of styrene, 1 g. of divinyl benzene, and 1.5 g. of ethyl styrene, with 1 g. of benzoyl peroxide dissolved therein, was added to the contents of the flask. The stirred mixture was then heated to 90° C. and held there for one and one-half hours, after which the mixture was heated at refluxing temperature for an additional one and one-half hours. The reaction mixture was then cooled to room temperature and the solid spheroids of the copolymer were separated from the liquid by decantation and filtration, air-dried, and finally oven-dried for two hours at 125° C.

In a similar manner copolymers containing higher amounts of divinyl benzene may be prepared.

B. Fifty grams of the beads of copolymer prepared in part A above were placed in a one-liter, three-necked, balloon flask equipped with thermometer, mechanical stirrer, and reflux condenser. This amount corresponds to 0.5 mole of styrene in the form of a cross-linked copolymer. One hundred grams (1.25 moles) of chloromethyl ether, having the formula $CH_3-O-CH_2Cl$, was added and the mixture was allowed to stand at room temperature for 15 minutes during which time the beads of copolymer swelled. The mixture was then diluted with 115 ml. of petroleum ether (B. P. 30° C.–60° C.) and agitation was begun. The reaction mixture was cooled to 0° C. by means of an ice-salt bath and at this point 30 grams (0.23 mole) of anhydrous, powdered aluminum chloride was added in small portions over a period of one hour, after which the mixture was stirred at 0° C. for two hours. Then 500 ml. of ice-water was slowly added in order to decompose the excess of aluminum chloride and chloromethyl ether. The resultant mixture was stirred for 30 minutes and was filtered. The beads were first dried in air, then washed several times with water and finally dried in an oven at 125° C. for two hours.

The beads contained 21.97% chlorine by analysis.

C. In a 500 ml., three-necked, balloon flask, equipped with an agitator, reflux condenser, thermometer, and a gas-inlet tube, were placed 115 ml. of benzene and 50 grams of the chloromethylated beads prepared in part B above. Agitation was begun and the mixture was heated to refluxing temperature and held there for 30 minutes, during which time the beads swelled. The mixture was cooled to 20° C. and was saturated with anhydrous trimethylamine gas. The mixture was then heated to 50° C.–55° C. and held there for four hours while a steady stream of trimethylamine was passed therethrough. The mixture was then cooled to room temperature and allowed to stand overnight, after which the beads were filtered off, washed twice with benzene, and air-dried. The dried beads, free of benzene, were then mixed with a 10% aqueous solution of sulfuric acid for two hours, after which they were washed thoroughly with water and were finally converted to the form of the quaternary ammonium hydroxide by being stirred with a 15% aqueous solution of sodium hydroxide. The final product was washed with water until the washwater no longer gave a pink color with phenolphthalein.

The dried beads contained 5.68% nitrogen by analysis, had high capacity for adsorbing anions, and had such physical characteristics suitable for use in commercial water-treating apparatus. The beads were also capable of repeated use in adsorbing ions and being regenerated.

*Example 2*

A. Into a five-liter, three-necked, balloon flask equipped with thermometer, mechanical stirrer, and reflux condenser was poured 1800 ml. of water which contained as dispersing agent 27 g. of a 20% solution of a copolymer of substantially equal parts of styrene and maleic acid dissolved in aqueous ammonia. Agitation was begun and a solution containing 10.8 g. of benzoyl peroxide dissolved in 1080 g. of styrene was added to the contents of the flask. The stirred mixture was then heated to 85° C.–90° C. and held there for four and one-half hours. The reaction mixture was cooled to room temperature by the addition of cold water, and the spheroids of polystyrene were separated from the liquid by decantation and filtration and then allowed to air-dry overnight.

The yield of polystyrene particles was quantitative. At this stage the polystyrene particles were fusible and soluble in all of the polystyrene solvents.

B. Forty-three grams of chloromethyl ether, having the formula $CH_3-O-CH_2Cl$, containing 13.12 g. (0.1 mole) of anhydrous, powdered aluminum chloride dissolved therein was poured into a one-liter, three-necked, balloon flask equipped with a thermometer, mechanical stirrer and reflux condenser. The flask and contents were cooled to 0° C. by means of an ice-salt bath and 100 ml. of petroleum ether (B. P. 30° C.–60° C.) was added. Agitation was begun and 25 g. of polystyrene particles prepared in part A above were added in small portions, over a period of 30 minutes after which the cooling bath was removed. The reaction mixture was stirred for three hours at room temperature. Then the mixture was again cooled to 0° C. by means of an ice-salt bath and 125 ml. of ice-water was slowly added in order to decompose the excess of aluminum chloride and chloromethyl ether. The resultant mixture was stirred for one hour and was filtered. The beads were washed with water for two hours, filtered, and dried in an oven for two hours at 125° C.

At this stage the beads were infusible and insoluble in all of the common solvents for polystyrene. The beads contained 18.16 per cent chlorine by analysis.

C. In a one-liter, three-necked, balloon flask, equipped with a mechanical stirrer, reflux condenser, thermometer, and a gas-inlet tube, were placed 250 ml. of toluene and 30 grams of the chloromethylated beads prepared in part B above. This mixture was allowed to stand at room temperature for one hour, during which time the beads swelled. Agitation was begun and the mixture was cooled to 20° C. and saturated with anhydrous trimethylamine gas. The mixture was then allowed to come to room temperature and stirred for four hours. After this time agitation was stopped and the beads were removed by filtration. The toluene-wet beads were stirred for one hour in two 200 ml. portions of methanol in order to remove the last traces of toluene. The beads were removed by filtration, washed with water, and stirred with 500 ml. of 10% hydrochloric acid for two hours. (At this stage analysis of the beads showed that they contained 4.27% N and 10.97% Cl.) The acid-leached beads were washed thoroughly with water and were finally converted to the form of the quaternary ammonium hydroxide by being washed in a column with a 5–10% aqueous solution of sodium hydroxide until a positive chloride ion test could no longer be obtained. The final product was washed with water until the wash-water no longer gave a pink color with phenol phthalein.

In a similar manner quaternary ammonium methylene resins may be prepared from other base resins containing aromatic nuclei.

While the utilization of these resins to avoid acidic conditions in deionization processes has been described in particular with reference to their utilization in removing salts from sugar syrups in the refining of sugar, they may be utilized in an analogous manner for removing salts from other aqueous media. For example, the molasses that is obtained by the conventional sugar refining processes may be greatly improved in quality by removing the salts from it by the process herein-described. Gelatin solutions may also be deionized without danger of generating acid. It is also sometimes desirable to remove the ionizable materials from milk and this can very readily be done without danger of forming an excessively acid condition by using a combination of the new quaternary ammonium anion-exchange resins with carboxylic type cation-exchange resins.

The word "syrup" is used herein without regard to any degree of sugar concentration and is intended to include the thin juices and other sugar solutions as well as the more concentrated.

I claim:

1. A process of removing alkali and alkaline earth salts aqueous solutions which comprises passing the solution first through a bed of an anion-exchange resin containing quaternary ammonium hydroxide groups attached through methylene groups to aromatic rings in the resin and then through a bed of cation-exchange resin.

2. A process of removing alkali and alkaline earth salts from aqueous solutions which comprises passing the solution first through a bed of an anion-exchange resin containing quaternary ammonium hydroxide groups attached through methylene groups to aromatic rings in the resin and then through a bed of cation-exchange resin in which the polar groups are carboxylic acid groups.

3. A process of removing alkali and alkaline earth salts from aqueous solutions which comprises passing the solution first through a bed of anion-exchange resin containing quaternary ammonium hydroxide groups attached through methylene groups to the aromatic rings of a styrene polymer and then through a bed of cation-exchange resin.

4. A process of removing alkali and alkaline earth salts from aqueous solutions which comprises passing the solution first through a bed of anion-exchange resin containing quaternary ammonium hydroxide groups attached through methylene groups to the aromatic rings of a styrene-divinyl benzene copolymer and then through a bed of cation-exchange resin.

5. The method of removing mineral salts from a dilute aqueous solution of sucrose which comprises first directing the solution through a bed of an alkali-activated, highly basic anion-exchange resin containing quaternary ammonium groups and then through a bed of acid-activated cation-exchange material.

6. The method of removing mineral salts from a dilute aqueous solution of sucrose which comprises first directing the solution through a bed of an alkali-activated, highly basic anion-exchange resin containing quaternary ammonium groups and then through a bed of acid-activated cation-exchange material in which the principal polar groups are carboxylic acid groups.

7. The process of removing mineral salts from a solution containing a substance sensitive to low pH conditions which comprises first directing the solution through a bed of an alkali-activated highly basic anion-exchange resin containing quaternary ammonium groups and then through a bed of acid-activated cation-exchange material in which the principal polar groups are carboxylic acid groups.

8. A process of removing mineral salts from an aqueous solution which comprises first directing the solution through a bed of a highly basic anion exchange resin containing quaternary ammonium groups, then through a bed of acid activated cation exchange material.

9. The process of removing mineral salts from a dilute sucrose solution which comprises first directing the solution through a bed of a highly basic anion-exchange resin, which contains quaternary ammonium hydroxide groups attached through methylene groups to the aromatic rings of a styrene-divinylbenzene copolymer, and then through a bed of a cation-exchange resin which is a copolymer of divinylbenzene and methacrylic acid.

CHARLES H. McBURNEY.

References Cited in the file of this patent

UNITED STATES PATENTS

| Number | Name | Date |
|---|---|---|
| 2,151,883 | Adams | Mar. 28, 1939 |
| 2,155,318 | Liebknecht | Apr. 18, 1939 |
| 2,228,514 | Griessbach | Jan. 14, 1941 |
| 2,301,669 | Richter | Nov. 10, 1942 |
| 2,319,359 | Wassenegger | May 18, 1943 |
| 2,340,110 | D'Alelio | Jan. 25, 1944 |
| 2,340,111 | D'Alelio | Jan. 25, 1944 |

FOREIGN PATENTS

| Number | Country | Date |
|---|---|---|
| 495,032 | Great Britain | Nov. 4, 1938 |

OTHER REFERENCES

Buck et al., Ind. and Eng. Chem., July 1945, pages 635 to 638.

Myers, Ind. and Eng. Chem., June 1941, pages 697 to 704 (page 698, column 2, pertinent).

Ser. No. 359,575, Smit (A. P. C.), published May 11, 1943.